United States Patent [19]

Phillips

[11] 4,313,104
[45] Jan. 26, 1982

[54] FENDER GUIDE

[76] Inventor: Edward J. Phillips, 1321 Union Ave., Kansas City, Mo. 64101

[21] Appl. No.: 72,423

[22] Filed: Sep. 4, 1979

[51] Int. Cl.$^3$ ............................ B60Q 1/32; B60Q 1/48
[52] U.S. Cl. ........................................ 340/102; 340/61;
340/87; 340/100; 340/119; 340/127; 362/83;
248/475B; 248/514; 293/44; 116/28 A
[58] Field of Search ............... 340/102, 100, 51, 61,
340/84, 87, 90, 119, 142, 127–134; 362/63, 66,
71, 78, 81, 82, 83, 191; 248/475 B, 514, 517, 145,
289 R, 289 A; 224/29 R, 42.03 R, 42.08;
293/44, 45, 65, 66, 70, 74; 403/72, 73, 148, 83,
84; 116/28 R, 28 A

[56] References Cited

U.S. PATENT DOCUMENTS

| | | | |
|---|---|---|---|
| 2,143,997 | 1/1939 | Parkinson | 340/61 |
| 2,144,286 | 1/1939 | Dawson | 340/61 |
| 2,733,030 | 1/1956 | Hawthorne | 248/514 |
| 3,450,378 | 6/1969 | Cucka | 248/514 |
| 3,644,887 | 2/1972 | Phillips | 340/102 |
| 4,042,816 | 8/1977 | Smoot | 362/83 |
| 4,141,109 | 2/1979 | Farrell | 248/289 R |

*Primary Examiner*—John W. Caldwell, Sr.
*Assistant Examiner*—Donnie Lee Crosland
*Attorney, Agent, or Firm*—D. A. N. Chase; Michael Yakimo, Jr.

[57] ABSTRACT

A breakawy fender guide for a vehicle has an upright elongated tube member yieldably mounted to the vehicle bumper by means of a breakaway hinge member attached to the lower portion of the guide. Upon mounting the hinge provides for a selected displacement of the guide from the side of the vehicle to provide a visual marker to the vehicle operator indicating the outboard side thereof. A hinge pin threaded at the ends thereof engages a nut/washer combination in an adjustable bearing relationship against the barrel sections of the respective leaves of the hinge for variously adjusting the force needed to urge the hinge into breakaway movement so as to move the guide from the selected position. Furthermore, the hinge provides operator positioning of the fender guide in an aligned position with the bumper of the vehicle so as to meet all state and federal highway width requirements as well as provides for movement of the guide from the selected position in response to forceful contact with an obstruction extending into the vehicle outboard limit during critical maneuvering thereof. The tubular fender guide is tapered and tapped at the top end thereof so as to present a reduced internal rim that mates a threaded light assembly to the top of the fender guide.

5 Claims, 6 Drawing Figures

FENDER GUIDE

BACKGROUND OF THE INVENTION

Previous fender guides such as applicant's warning device set forth in U.S. Pat. No. 3,644,887, issued Feb. 27, 1972, have been mounted directly to the side of the vehicle either by welding or a direct bolt/nut engagement thereto. Such means of mounting have presented various problems including the tendency of the fender guides to crystallize and break due to the direct transference of vehicle vibration to the fender guides, as well as the fixed guides being unyielding to contact with obstructions extending within the outboard limits of the vehicle. Also, width requirements, especially the eight-foot width law and more restrictive state laws limit the use of fixedly mounted fender guides as there is no means for variously displacing the guide from the side of the vehicle to meet the various width requirements.

The present invention has addressed the above problems by use of a breakaway hinge member mounting the fender guides to the bumper of the vehicle at the respective side thereof. The hinge and use of insulated clamps for holding the fender guide therein dampens the vibration between the truck and guide so as to prevent crystallization and breakage. Also, the breakaway hinge provides a yieldable mounting to the guide so that it can be swingable upon sufficient contact with an obstruction entering the outboard limits of the vehicle. Furthermore, the fender guide can be moved to a fully retracted position in alignment with the end of the vehicle bumper so as to meet the various state and federal width requirements of the highways to be travelled.

It is therefore an object of this invention to provide a visual fender guide which may be mounted in a breakaway position to the exterior of the vehicle to indicate to the driver the outboard side of the body of the vehicle.

Another important object of this invention is to provide a breakaway hinge for mounting the fender guide to the bumper of the vehicle.

A further object of this invention is to provide a means of mounting the fender guide, as aforesaid, which allows the device to be selectively positioned through a range of displacements relative to the side of a vehicle.

Still another important object of the invention is to provide a means of mounting the fender guide, as aforesaid, which responds to a preselected force of contract with an obstruction protruding into the defined outboard limit of the vehicle so as to swing away therefrom.

Another object of this invention is to provide a means of mounting the fender guide, as aforesaid, which can be adjusted so as to vary the holding force upon the fender guide including the force required for initiating breakaway movement.

Still a further object of this invention is to provide a means of mounting the fender guide, as aforesaid, which allows the fender guide to be positioned within the required width limits of the vehicle during travel as well as allows subsequent positioning of the device outside these limits during periods of critical vehicle maneuvering.

Still another important object of the invention is to provide means for mounting a fender guide to the vehicle, as aforesaid, which absorbs the vibrations of the vehicle during movement thereof so as to delimit the vibrations absorbed by the fender guide for prevention of crystallization and breakage thereof.

Another important object of this invention is to provide light means for the fender guide, as aforesaid, allowing for night-time use.

Still a further object of this invention is to provide means for mounting a fender guide, as aforesaid, to a vehicle which is simple to manufacture and assemble, can be easily installed to the vehicle and is efficient in operation and use.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
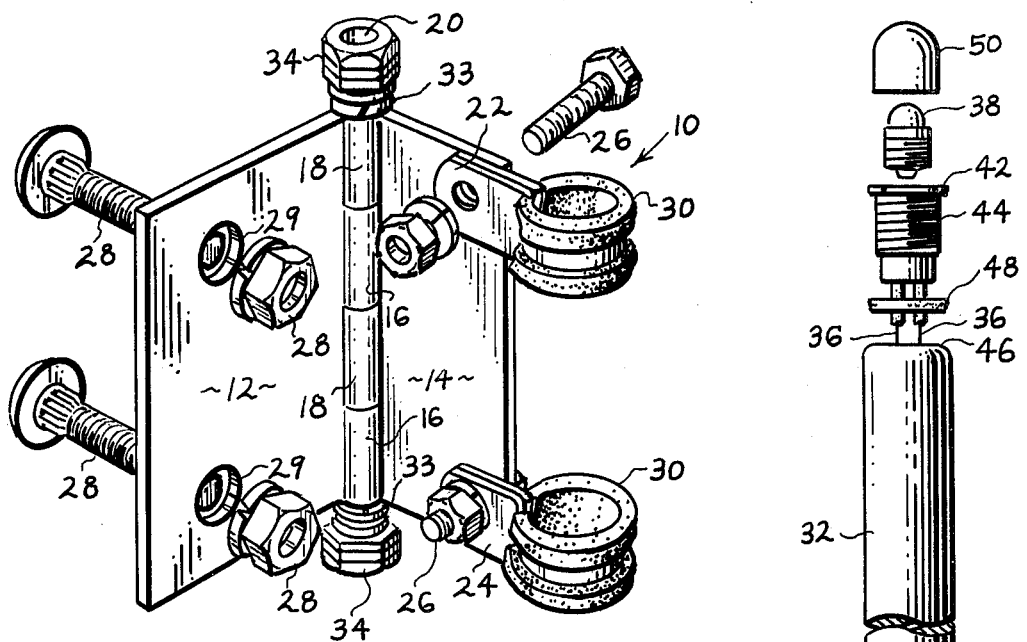
FIG. 1 is a perspective view of the breakaway hinge used for mounting the fender guide to the bumper of a vehicle.

Referring more particularly to the drawings, FIG. 1 shows the breakaway hinge 10 as generally comprising first and second leaf members 12 and 14 having integral barrel elements 16 and 18 adapted for pivotal connection about the hinge pin 20. Clamps 22 and 24 are secured to the second leaf 14 by a bolt/nut engagement 26 extending through aligned apertures 25 and 27 of the second leaf 14 and clamps 22 and 24. The first leaf 12 is adapted to be secured to the bumper 52 by means of a mounting bolt/nut engagement 28 extending through apertures 29 in the first leaf 12.

The clamps 22 and 24 receive therein bushings 30 for insulated clamping of the elongated tubular fender guide 32. Hinge pin 20 is threaded at the upper and lower ends thereof so as to receive a split washer 33 and triple hex nut 34. Upon engagement, the respective nuts 34 can be selectively tightened so as to cause the split washer 33 to bear upon the adjacent barrel sections 16 and 18 which adjust the degree of tension upon the respective leaf members 12 and 14 and thus, the ease of pivotal movement of the leaf members 12 and 14 about hinge pin 20. As diagramatically shown, wires 36 extend through the hollow guide 32 so as to connect the vehicle battery 37 in series with light bulb 38 and switch 40.

Figure 6:
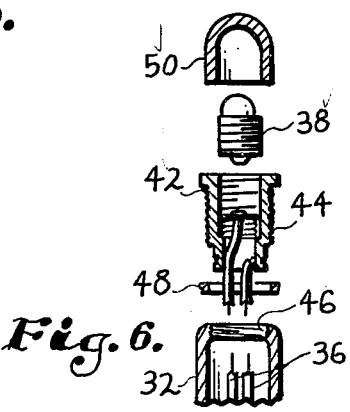
FIG. 6 is a sectional view showing the lamp socket assembly and means of mounting to the top of the fender guide.

As shown in FIG. 6, light bulb 38, as covered by lens 50 is inserted into the top of the fender guide 32 by threadable engagement with socket 42. Socket 42 is also externally threaded 44 for engagement with rim 46 of the fender guide 32. Rim 46, of a lesser diameter than the fender guide 32, is presented by a taper of the hollow tubular guide 32 at the top end thereof with subsequent tapping to provide threadable mating between rim 46 and threads 44. Washer 48 located between socket 42 and the top of the fender guide 32 allows for tightening therebetween to present a smooth overall appearance to the fender guide 32 as well as preventing entry of foreign elements therein. Also, the bulb 38 is easily changed by simple unscrewing from the socket 42.

Figure 2:
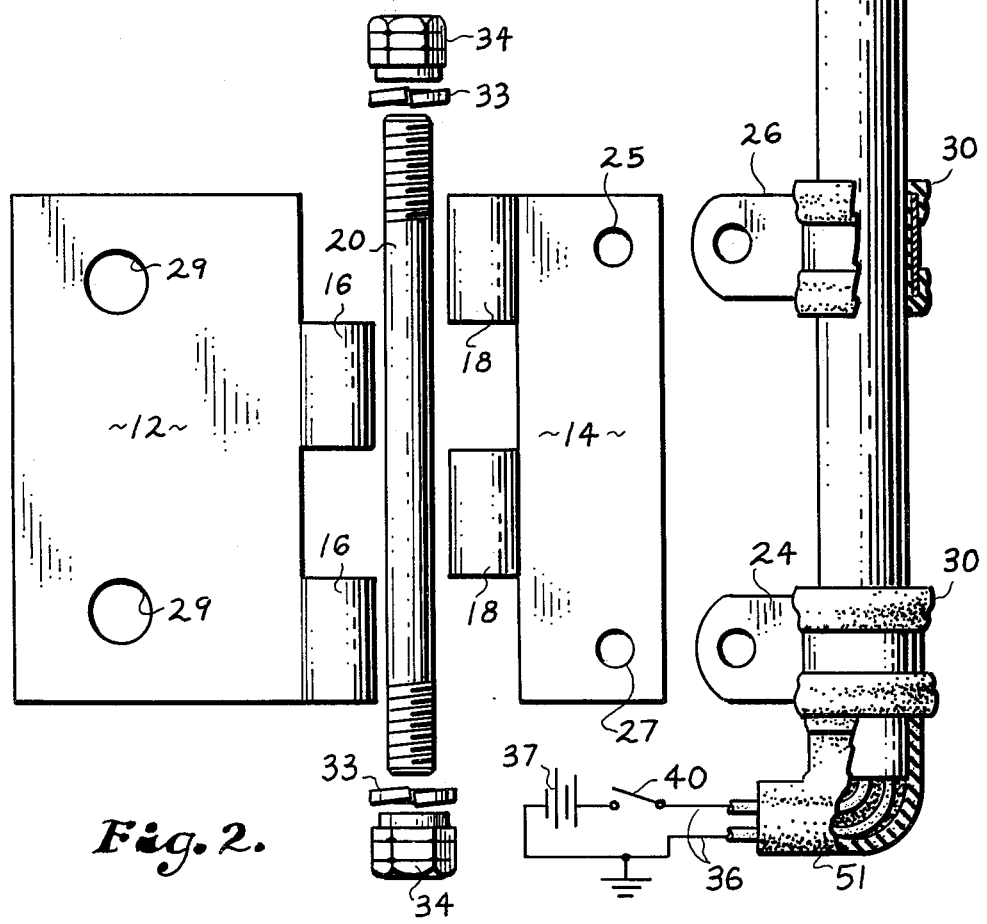
FIG. 2 is an exploded planar view of the breakaway hinge showing the members therein as well as the fender guide in engagement with the clamps thereof.

Attached to the lower end of the fender guide 32 is a rubber elbow 51 with wires 36 protruding therefrom to guide their extension to the vehicle battery and chassis ground as shown diagramatically in FIG. 2.

Figure 3:
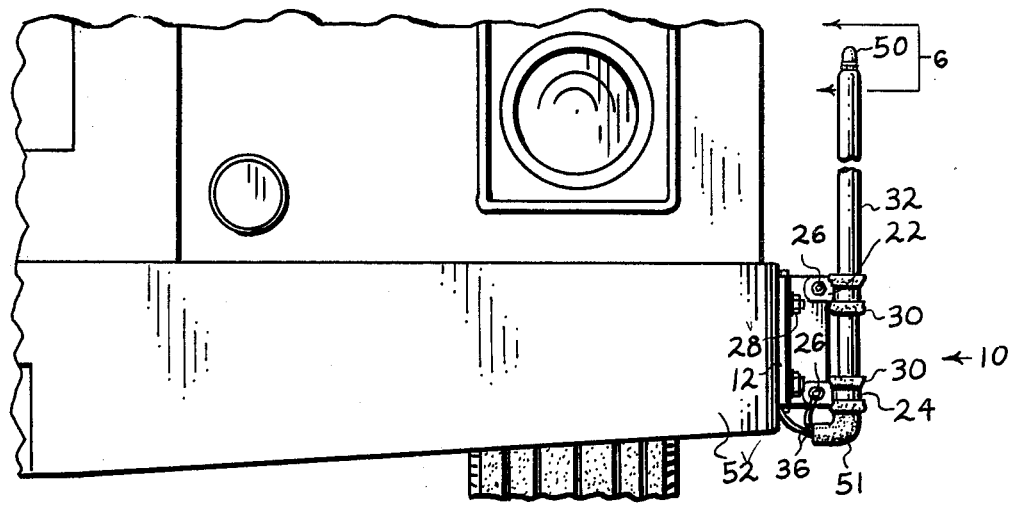
FIG. 3 is a front elevation view, on a reduced scale, showing the fender guide mounted by use of the breakaway hinge to the vehicle bumper in a laterally-spaced position relative to the side of the vehicle.
Figure 4:
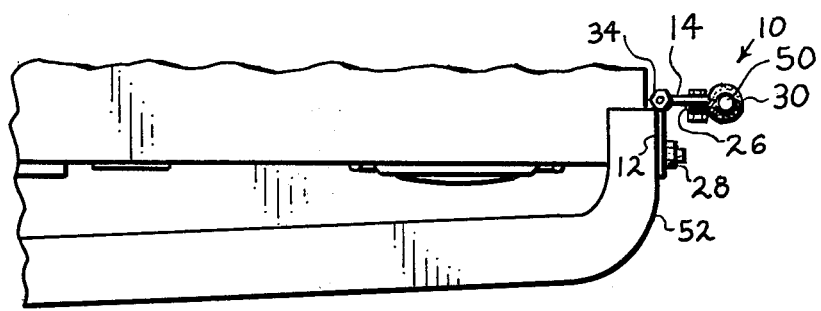
FIG. 4 is a top view of the breakaway hinge with fender guide attached as mounted in FIG. 3.
Figure 5:
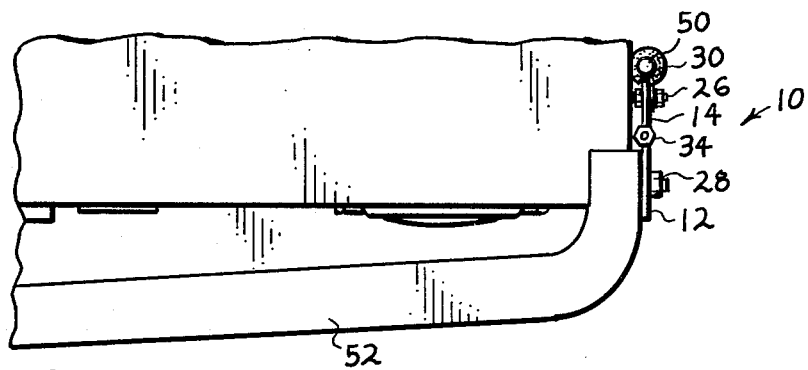
FIG. 5 is a top view, on a reduced scale, of the breakaway hinge member mounted to the bumper with fender guide attached, the fender guide being in a retracted position providing a substantial front to back alignment of the fender guide with the vehicle bumper.

As shown in FIGS. 3, 4 and 5, leaf 12 of hinge assembly 10 is mounted to bumper 52 by the bolt/nut combination 28 extending through the leaf 12 and bumper 52 with the hinge pin 20 at a rearwardly adjacent position relative to the vehicle bumper 26. During periods of critical maneuvering of the vehicle, leaf 14 of hinge 10 can be selectively pivoted to position the attached fender guide 32 at a selective lateral displacement from the side of the vehicle, as shown in FIGS. 3 and 4, for defining the outboard limit thereof. Guide 32 should be of a length so as to establish an unobstructed line of sight with the vehicle operator.

Nut/washer combination 34, as previously described, can then be selectively tightened about the hinge pin 20 so as to present a selected holding force to leaf 14 to maintain the fender guide 32 at the selected position until such holding force is overcome either by sufficient contact with an obstruction protruding into the outboard limit of the vehicle, as defined by the fender guide 32, or by the force of the vehicle operator. Upon introduction of this greater force, breakaway movement will be provided to the hinge 10 for corresponding movement to the fender guide 32 as provided by pivotable motion of leaf 14 about hinge pin 20.

On federal highways and in various state highways overall width limits of eight feet have been imposed. Thus, in such instances it may be necessary, depending on the original width of the vehicle, to move the fender guides 32 to a retracted position as shown in FIG. 5 at which the fender guide 32 is in a front-to-back alignment with the end of the bumper 26. During periods of critical maneuvering the fender guide 32 can be moved to a selected position as shown in FIGS. 3 and 4.

It is preferred that the device as described is made of a high-quality stainless steel so as to resist rust and tarnish. Also, such quality material will not crystallize and break as further aided by the insulated clamps as above discussed.

Having thus described the invention, what is claimed as new and desired to be secured by Letters Patent is:

1. In combination with a bumper of a vehicle, a fender guide for visually locating the outboard side of the body of the vehicle, said guide comprising:
   an elongated, upright marker member having a lower end portion;
   a hinge assembly for mounting said member to an end of said bumper in movement between a normal operator-selected position at which the member is spaced laterally away from the bumper, and a retracted position in substantial front-to-back alignment with said end of the bumper, said hinge assembly including first and second leaf members with said first leaf member secured to said bumper and said second leaf member receiving said lower portion;
   a barrel member section on each of said leaf members for presenting a continuous hinge barrel upon alignment of said sections therebetween;
   a common hinge pin inserted in said continuous hinge barrel to provide a generally vertical axis of pivot for movement of said second leaf member through a horizontal plate; and
   means on said hinge pin and bearing against said barrel member section on said second leaf for applying a selectable holding force to said second leaf member for maintenance of said leaf at said selected position, and for allowing said movement of second leaf towards said retracted position in response to a greater opposing force applied to said marker member.

2. The combination as claimed in claim 1, further comprising at least one clamp attached to said second leaf and circumscribing said lower portion of said upright marker member, and a rubber-like bushing sandwiched between said clamp and said lower portion.

3. The combination as claimed in claim 1, wherein said member is tubular and has an upper end provided with an electric lamp, and there being electrical lead means extending from said lamp downwardly through said tubular member.

4. The combination as claimed in claim 1, wherein said member terminates in a tapered upper end provided with a lamp assembly having a socket, an electric lamp in said socket, and a lens over said lamp, said socket being provided with external threads, said member being tubular and said upper end having a reduced internal diameter mating with said threads, said socket being threaded into said upper end, and there being electrical lead means extending from said socket downwardly through said tubular member.

5. In combination with a bumper of a vehicle, a fender guide having an elongated upright marker member mounted thereto for visually locating the outboard side of the body of the vehicle, the improvement comprising means for mounting said marker member to said bumper for movement through a horizontally disposed arc lying adjacent to the end of said bumper comprising:
   a hinge assembly on the lower portion of said marker member for mounting said member to said end of said bumper for swingable movement through said arc as defined by a normal position selected by an operator of the vehicle at which said marker member is spaced laterally away from the bumper and a retracted position in substantial front-to-back alignment with said end of the bumper; and
   means engaging said hinge assembly for applying a selectable holding force thereto to maintain said marker member in said normal position and for allowing movement of said member through said arc and towards said retracted position in response to a greater opposing force applied to said marker member.

* * * * *